(12) United States Patent  (10) Patent No.: US 7,126,971 B2
Killinger  (45) Date of Patent: Oct. 24, 2006

(54) OPEN-PATH LASER/OPTICAL COMMUNICATION SYSTEMS AND METHODS UTILIZING WAVELENGTHS BETWEEN ATMOSPHERIC AND GASEOUS ABSORPTION LINES

(75) Inventor: Dennis K. Killinger, Temple Terrace, FL (US)

(73) Assignee: University of South Florida, Tampa, FL (US)

( * ) Notice: Subject to any disclaimer, the term of this patent is extended or adjusted under 35 U.S.C. 154(b) by 394 days.

(21) Appl. No.: 10/604,193

(22) Filed: Jun. 30, 2003

(65) Prior Publication Data

US 2004/0105468 A1  Jun. 3, 2004

Related U.S. Application Data

(63) Continuation of application No. PCT/US02/02865, filed on Jan. 30, 2002.

(60) Provisional application No. 60/265,022, filed on Jan. 30, 2001.

(51) Int. Cl.
*H01S 3/10* (2006.01)
*H01S 3/13* (2006.01)

(52) U.S. Cl. .......................... 372/20; 372/32
(58) Field of Classification Search ................. 372/20, 372/32
See application file for complete search history.

(56) References Cited

U.S. PATENT DOCUMENTS

| | | | |
|---|---|---|---|
| 4,435,808 A | 3/1984 | Javan | |
| 4,823,354 A | 4/1989 | Znotins et al. | |
| 5,033,114 A | 7/1991 | Jayaraman et al. | |
| 5,780,843 A * | 7/1998 | Cliche et al. | 250/226 |
| 5,978,391 A * | 11/1999 | Das et al. | 372/20 |
| 6,160,832 A | 12/2000 | Kleinschmidt et al. | |
| 6,269,110 B1 * | 7/2001 | Leinhos et al. | 372/57 |
| 6,396,582 B1 * | 5/2002 | Buck et al. | 356/328 |
| 6,580,517 B1 * | 6/2003 | Lokai et al. | 356/519 |
| 6,587,484 B1 * | 7/2003 | May | 372/20 |
| 2004/0105468 A1 * | 6/2004 | Killinger | 372/20 |

* cited by examiner

*Primary Examiner*—James Menefee
(74) *Attorney, Agent, or Firm*—Ronald E. Smith; Smith & Hopen, P.A.

(57) ABSTRACT

An open-path optical communication system has either optical or laser sources and communicates between the source and a detector. In a first embodiment, the laser source includes a gas cell in the laser cavity to regulate laser wavelengths based on the minimum absorption between spectral lines of the gas in the cell. The laser is tuned close to a minimum absorption wavelength and the minimum absorption line locks the laser wavelength to the minimum position. In a second embodiment, the strong absorption lines of a gas in a gas cell positioned at a receiver site are used to provide channel isolation of the receiver. In a third embodiment, an atmospheric gas provides the channel isolation. In the fourth embodiment, individual wavelength channels are positioned between the absorption lines of atmospheric or non-atmospheric gases to prevent cross-talk between adjacent channels.

5 Claims, 3 Drawing Sheets

OPEN-PATH LASER/OPTICAL COMMUNICATION SYSTEMS AND METHODS UTILIZING WAVELENGTHS BETWEEN ATMOSPHERIC AND GASEOUS ABSORPTION LINES

RELATED APPLICATIONS

The present application is a continuation of prior filed International Application, Ser. No. PCT/US02/02865, filed Jan. 30, 2002, which International Application claims a priority date of Jan. 30, 2001 based on prior filed U.S. Provisional Application Ser. No. 60/265,022.

BACKGROUND OF THE INVENTION

1. Field of the Invention

This invention relates to methods for relaying information between two or more points using laser or optically generated conductive transport means through the atmosphere to convey the information.

2. Description of the Prior Art

Radio waves or other optical transport waves and less sophisticated systems using wires, fiber-optic cables, and other physical transport means have been employed to relay information between two or more points. Radio transmissions are heavily dependent upon atmospheric conditions, and fiber-optic cables or other physical transport means are expensive.

Communication systems are therefore needed that do not rely upon radio transmissions, fiber-optic cables, or other physical transport means.

An open path laser beam communication system overcomes many of the problems associated with prior art communication systems, but has its own limitations. Specifically, meaningful multi-channel WDM (Wavelength Division Multiplexed), open-path laser communication requires that each laser be at a different wavelength, and possibly tunable. Tunable lasers require tuning elements such as gratings, etalons, and the like. These tuning elements can tune wavelengths to a precision of 1 nm (1 cm$^{-1}$). Finer wavelength control is difficult and expensive to maintain using conventional techniques. Typically, a laser wavelength is locked to a peak maximum absorption of a gas that is internal or external to the laser cavity, or to an external wavelength spectrometer instrument.

Wavelength-controlled laser/optical open-path communication systems often have difficulty in controlling the laser wavelength to that of the receiver optical bandwidth. Moreover, multi-wavelength channel cross talk is often a problem because it is difficult to produce very narrow (<10 nm) optical filters.

However, in view of the prior art considered as a whole at the time the present invention was made, it was not obvious to those of ordinary skill in the art how the limitations of the known systems and methods could be overcome.

SUMMARY OF INVENTION

The long-standing but heretofore unfulfilled need for a laser that does not require fine wavelength control is now provided by a system that incorporates, in a first embodiment, a laser having a non-filter bandwidth-defining structure preferably in the form of a gas cell positioned in the laser cavity.

The gas cell positioned inside the laser cavity enables the laser to operate at wavelengths between the maximum absorption line wavelengths of the gas in the cell. This is the spectral position or wavelength that has higher gain, i.e., the lowest absorption loss. Accordingly, the only tuning required is a coarse wavelength control such as a grating prism. The need for additional equipment providing fine wavelength control is therefore obviated.

More particularly, a gas cell containing gas with individual vibrational-rotation line spectra is positioned inside a tunable laser cavity having a resonance wavelength and the cavity resonance wavelength is positioned between adjacent absorption lines of the gas. The laser therefore operates at an absorption minimum that occurs between the absorption lines and the laser wavelength is locked to an absolute wavelength defined by the gas. Advantageously, the maximum absorption bands act as filters for the laser wavelength output.

In a second embodiment, the need to control laser wavelength to that of a receiver optical bandwidth is fulfilled by harnessing strong optical absorption lines in a preselected gas in a gas cell positioned at a receiver site upstream of the receiver. This provides an absolute wavelength reference or control for laser wavelength and receiver/detector optical bandwidth in an open path laser/optical communication system.

In a third embodiment, the need to control laser wavelength to that of the receiver optical bandwidth is fulfilled by harnessing the strong optical absorption lines in the atmosphere that are due to atmospheric oxygen.

A fourth embodiment discloses a novel method for controlling a wavelength-controlled laser to the optical bandwidth of a receiver means in an open-path communication system. The laser is tuned so that it lases at minimum absorption wavelengths positioned between strong rotational-vibrational spectral absorption lines in atmospheric gases. The strong absorption lines provide optical guard channels that prevent cross-talk between adjacent wavelength channels. An absorption line minimum locks the laser to the minimum absorption position and reliance upon optical bandwidth filters in a receiver channel is reduced. An external tuning means is employed to tune the laser to within a few nanometers of the minimum absorption wavelength so that it lases at the minimum spectral absorption lines where the laser cavity has maximum gain. Positioning an absorbing gas cell in the laser cavity of the laser forces the laser output to operate at wavelengths at the minimum of the spectral absorption lines.

An important object of this invention is to provide a tunable laser having a gas cell positioned within the laser cavity.

A more specific object is to provide a laser communication system laser source that operates at known absolute wavelengths defined by the minimum of absorption between gaseous absorption lines.

Another object is to provide a laser system that operates with inexpensive coarse tuning equipment and does not require expensive fine tuning equipment.

Still another object is to optimize the wavelengths used in a laser communication system to select wavelengths that use the absorption characteristics of the atmosphere or external gas cell to enhance the performance of a laser communication system detection device.

Another important object is to provide a method for providing optical guard channels that prevent cross-talk between adjacent wavelength channels.

DETAILED DESCRIPTION

Figure 1:
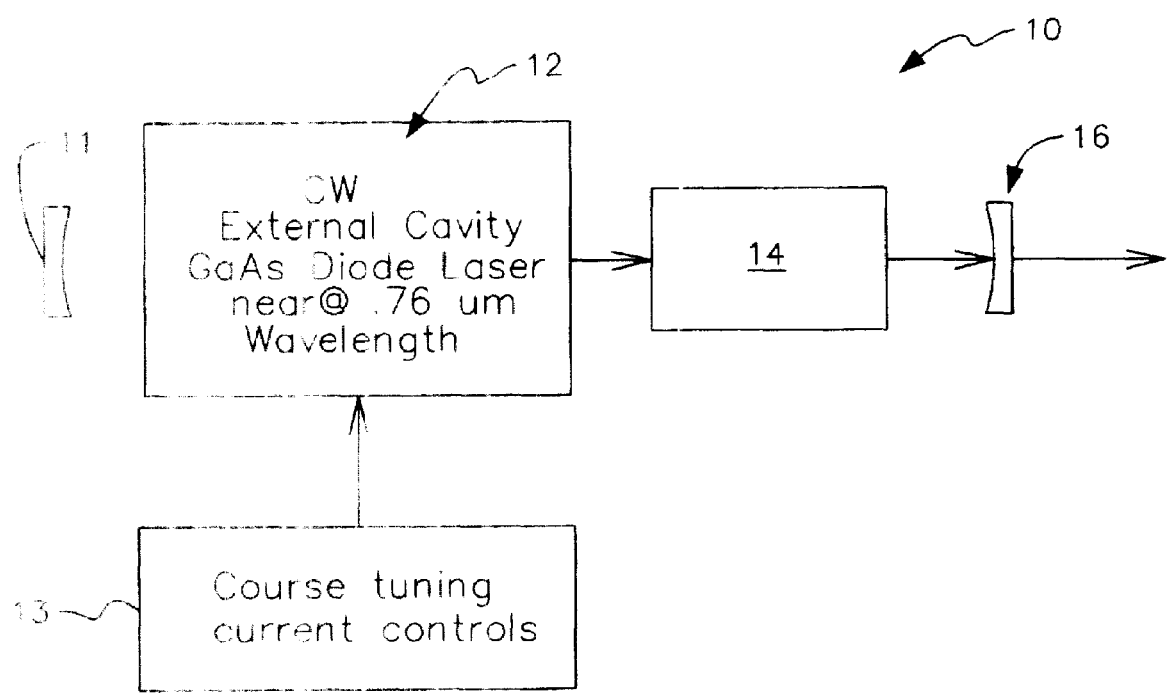
FIG. 1 is a schematic view of a laser beam source where a beam is locked on a wavelength determined by the absorption characteristics of a gas cell.

Referring now to FIG. 1, it will there be seen that a laser source having a gas cell as an integral part of the laser mechanism, i.e., within the laser cavity is denoted as a whole by the reference numeral 10. A beam from continuous-wave laser 12 sequentially passes through gas cell 14 and laser cavity output mirror 16. Because of the gas cell in the laser cavity, the resultant beam is locked to the actual minimum absorption bands of the gas selected in the cell.

Laser 12 is preferably provided in the form of a continuous wave external cavity GaAs diode laser having a wavelength of 0.76 μm. The laser assembly further includes back laser cavity mirror 11 and a coarse tuning current control means 13. Lasers of types other than continuous wave can also have wavelengths selected in this manner.

Gas cell 14 is preferably ten meters in optical path length and contains oxygen at a pressure of one atmosphere.

Gas cell 14 contains gas with individual vibrational-rotation line spectra. Significantly, it is used within a tunable laser cavity as depicted in FIG. 1. Coarse wavelength tuning is conducted using gratings, prisms, or etalons to position the cavity resonant wavelength between adjacent absorption lines of the gas. The laser operates at the absorption minimum occurring between the gas absorption lines, thus locking the laser wavelengths to the absolutes wavelength defined by the gas. This locked wavelength is at the minimum absorption of the gas as opposed to the maximum absorption of the gas as in the prior art methods using a gas cell positioned internally or externally to the laser cavity.

Figure 2:
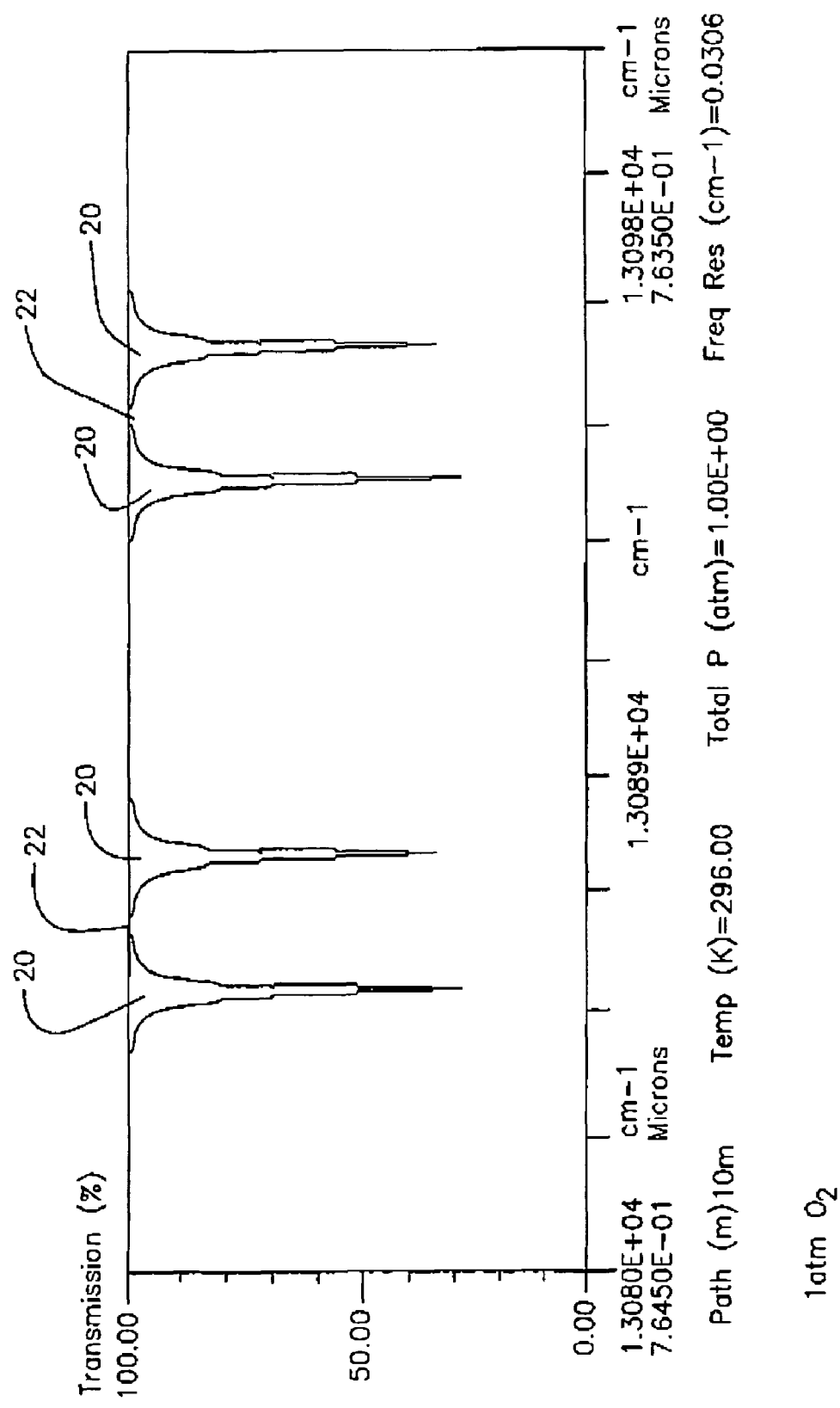
FIG. 2 is a graph depicting a portion of the oxygen absorption spectrum.

FIG. 2 depicts a spectrum of oxygen gas with absorption bands 20 and minimum absorption bands 22. In practice, the laser output in this system is now locked onto minimum absorption spectral region 22, and maximum absorption lines 20 act as a filter for the laser wavelength output. The novel system thus enables use of a less sophisticated, and less costly, laser and wavelength monitors relative to prior art reflection grating systems or an active cavity length turning device.

The novel system is also useful for wavelength control of fiber optic laser communication systems, pointopen-path laser communication systems and in open-path laser communication systems where barriers intervene between the transmitting and receiving communication devices such as those described in co-pending patent application filed Jan. 30, 2002, entitled OpenOptical Communication System And Method Using Reflected or Backscattered Light, by the same inventor, which disclosure is hereby incorporated by reference into this disclosure.

Figure 3A:
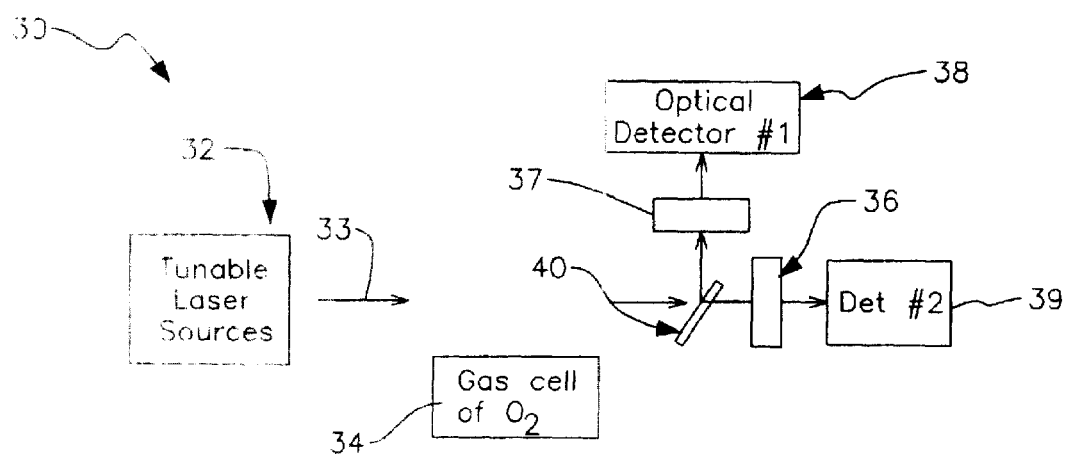
FIG. 3A is a schematic view of a laser system having an atmospheric gas cell for filtering wavelengths to the absorption characteristics of a selected gas.

Two embodiments of the invention are depicted in FIG. 3A, said embodiments being the second and third embodiments of the invention.

In the second embodiment, laser system 30 includes a gas cell 34 positioned upstream of a detector means to provide channel isolation at the receiver. The gas cell bandwidth system pre-filters the light at the detector means. Laser source 32, which can be a sole or multiple laser source, emits a beam of light 33 that is passed through gas cell 34 prior to passing through a moderate-bandwidth optical filter 36 to impinge upon a detector means such as detectors 38 and 39. This eliminates the use of highly expensive narrow-bandwidth optical filters because the gas in cell 34 acts in substantially the same way as the gas in the laser source of the first-described embodiment to filter the bandwidths to narrow bands defined by the absorption characteristics of the gas in said cell 34. The gas may be any atmospheric gas such as oxygen, carbon dioxide, nitrogen, etc., or it may be any non-atmospheric gas such as HI, HF, or even benzene. The use of any specific gas is the choice of one of ordinary skill in the art, as the selection is based on the specific absorption lines of that gas and specific application requirements.

This novel use of gas cell 34 is further advantageous because individual wavelength channels are formed between the absorption lines of the gas in the gas cell so that said absorption lines block each channel from its adjacent channel.

Beam splitter 40 enables a user to set the detection wavelengths in a plurality of detectors to various discrete wavelengths as defined by the gas in the intervening cell. Again, less costly filters such as moderate-bandwidth optical filters are used at the detector site because unwanted nearby wavelengths are filtered out by the absorption characteristics of the gas by virtue of channel isolation.

More particularly, tunable laser source 32 is preferably a GaAs laser having #1=0.7660 μm and #2=0.7660 μm. The effective optical bandwidth of gas cell 34 is 5 cm$^{-1}$.

In the third embodiment, also depicted in FIG. 3A, light beam 33 follows an open path as in the incorporated disclosure and does not pass through gas cell 34. Light beam 33 does not pass through gas cell 34 but instead undergoes atmospheric absorption with oxygen. The channel isolation of the receiver thereby provided is similar to that of the second embodiment. This use of the atmosphere causes the formation of individual wavelength channels between the absorption lines of the oxygen so that said absorption lines block each channel from its adjacent channel.

In both the second and third embodiments, as illustrated in FIG. 3A, beam splitter 40 divides the beam so that part of it passes through optical filter 36 and another part of it passes through optical filter 37. The part of beam 33 that passes through optical filter 37 impinges upon optical detector 38 and the part thereof that passes through optical filter 36 impinges upon optical detector 39. Each optical filter is of the thin-film type and has a bandwidth of 15 cm$^{-1}$.

Figure 3B:
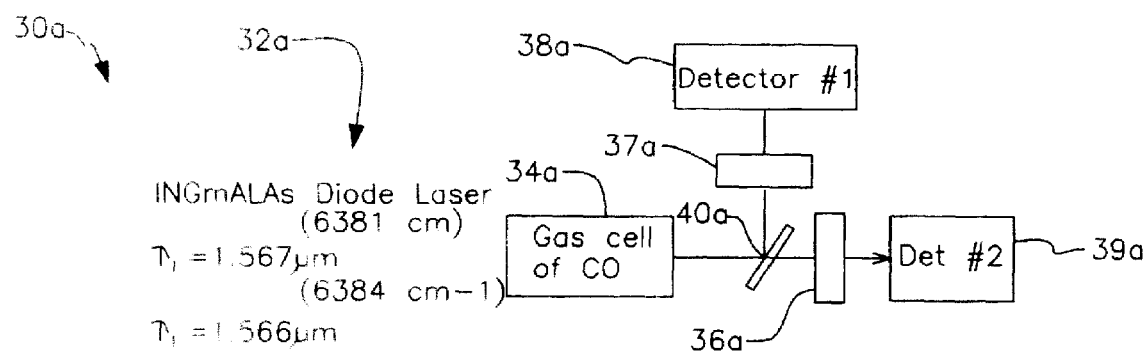
FIG. 3B is a schematic view of a variation of the system depicted in FIG. 3A.

FIG. 3B depicts a variation of the second embodiment. Laser source 30a is a GaAlAs diode laser where $\#_1$=1.567 μm(6381 cm$^1$) and $\#_2$=1.566 μm (6384 cm$^{-1}$). Gas cell 34a is ten meters in optical path length and contains carbon monoxide at one atmosphere of pressure. Beam splitter 40a divides the beam so that it passes through optical filters 36a and 37a, each of which has a 6 cm$^{-1}$ bandwidth. As in the second and third embodiments, the arrangement of FIG. 3B provides channel isolation at the receiver site of an open path laser system, and individual wavelength channels are blocked from their adjacent wavelength channels by the absorption lines of the gas in gas cell 34a.

The fourth embodiment of this invention harnesses the observation that many atmospheric and non-atmospheric gases have strong, individual and distinct rotational-vibrational spectral absorption lines. These absorption lines are used advantageously within a tunable laser cavity to force or control the laser to operate at wavelengths between the absorption line centers, i.e., where the transmission is highest. For a moderately tunable diode or other type of laser, an external tuning means such as grating, diode current, or temperature may be used to tune the laser close (within a few nanometers) to minimum absorption wavelength. The absorption line minimum locks the laser wavelength to the minimum position, i.e., the laser will lase at the minimum of the spectral absorption, where the laser cavity has the highest gain.

Multiple wavelength optical/laser open path communication systems operating through the atmosphere can operate at many simultaneous wavelength channels. If the individual wavelength channels occur between the absorption lines of non-atmospheric or atmospheric gases, then each channel is blocked from drifting (in wavelength) into the adjacent channel by the adjacent strong absorption line. As such, the strong absorption lines act like adjacent WDM optical bandwidth filters or Fabry-Perot transmission modes. The resultant optical blocking filters which still need to be used are wider in wavelength bandwidths and thus less expensive. For example, the approximately thirty (30) $CO_2$ gas absorption lines near 1.575 μm are separated by 2 to 3 $cm^{-1}$, i.e., about 2 to 3 Å or 0.2 to 0.3 nm. The narrow optical bandwidth filters would have a passband of 2 to 3 Å instead of a narrower bandwidth.

The fourth embodiment of this invention is therefore understood to be a method for preventing cross-talk between adjacent wavelength channels. The novel method includes the step of controlling a wavelength-controlled laser to the optical bandwidth of a receiver means in an open-path communication system by tuning the laser so that it lases at minimum absorption wavelengths positioned between strong rotational-vibrational spectral absorption lines in atmospheric gases. Strong absorption lines therefore provide optical guard channels that prevent the cross-talk. An absorption line minimum locks the laser to the minimum absorption position and reliance upon optical bandwidth filters in a receiver channel is reduced. This enables the use of less expensive optical bandwidth filters in the receiver/detector channel.

An external tuning means is used to tune the laser to within a few nanometers of the minimum absorption wavelength so that it lases at the minimum spectral absorption lines where the laser cavity has maximum gain. An absorbing gas cell positioned in the laser cavity of the laser forces the laser output to operate at wavelengths at the minimum of the spectral absorption lines.

The systems that use the gas cell absorption are appropriate for the open path systems of the incorporated disclosure, but they also may be used in direct pointlaser/optical systems and fiber optic laser/optical communication systems.

It may be appreciated by one skilled in the art that additional embodiments may be contemplated, including alternate embodiments of the laser or optical sources and the detectors.

In the foregoing description, certain terms have been used for brevity, clarity and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

Having now described the invention, the construction, the operation and use of preferred embodiments thereof, and the advantageous new and useful results obtained thereby, the new and useful constructions, and reasonable mechanical equivalents thereof obvious to those skilled in the art, are set forth in the appended claims.

The invention claimed is:

1. A method for tuning a laser, comprising the steps of:
   positioning a gas cell containing gas with individual vibrational-rotation line spectra inside a tunable laser cavity having a resonance wavelength;
   employing a coarse wavelength tuning means to position the cavity resonance wavelength between adjacent absorption lines of said gas; and
   operating said laser at an absorption minimum that occurs between said absorption lines;
   whereby the laser wavelength is locked to an absolute wavelength defined by the gas;
   whereby maximum absorption bands in said gas act as filters for laser wavelength output; and
   whereby said laser does not require means for fine wavelength tuning.

2. The method of claim 1, further comprising the step of using an external tuning means to tuoe the laser to within a few nanometers of the minimum absorption wavelength so that it lases at the minimum spectral absorption lines where said laser cavity has maximum gain.

3. A method for tuning a laser that does not require means for fine wavelength tuning, comprising the steps of:
   positioning a gas cell containing gas with individual vibrational-rotation line spectra outside a tunable laser cavity having a resonance wavelength;
   positioning the cavity resonance wavelength between adjacent absorption lines of said gas; and
   operating said laser at an absorption minimum that occurs between said absorption lines;
   whereby the laser wavelength is locked to an absolute wavelength defined by the gas.

4. The method of claim 3, wherein the step of positioning the cavity resonance wavelength between adjacent absorption lines of said gas includes using coarse wavelength tuning means.

5. The method of claim 4, further comprising the step of using an external tuning means to tune the laser to within a few nanometers of the minimum absorption wavelength so that it lases at the minimum spectral absorption lines where said laser cavity has maximum gain.

* * * * *